Dec. 26, 1967     D. F. REYNOLDS     3,360,295
TRACTOR CAB ASSEMBLY

Filed June 13, 1966     3 Sheets-Sheet 1

INVENTOR
DONALD F. REYNOLDS

BY Olsen and Stephenson
ATTORNEYS

Dec. 26, 1967  D. F. REYNOLDS  3,360,295
TRACTOR CAB ASSEMBLY
Filed June 13, 1966  3 Sheets-Sheet 2

INVENTOR
DONALD F. REYNOLDS

BY *Olsen and Stephenson*
ATTORNEYS

Dec. 26, 1967  D. F. REYNOLDS  3,360,295
TRACTOR CAB ASSEMBLY
Filed June 13, 1966  3 Sheets-Sheet 3
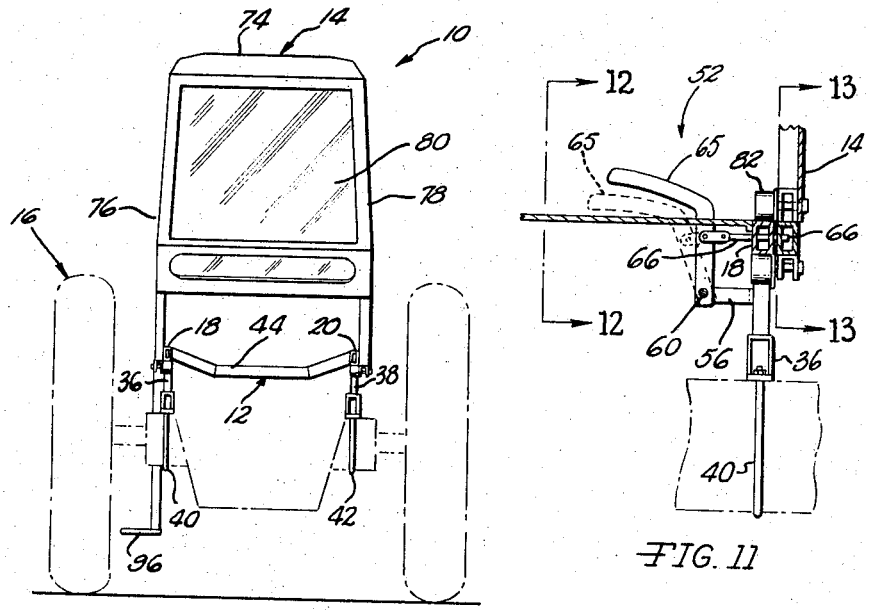
FIG. 10
FIG. 11
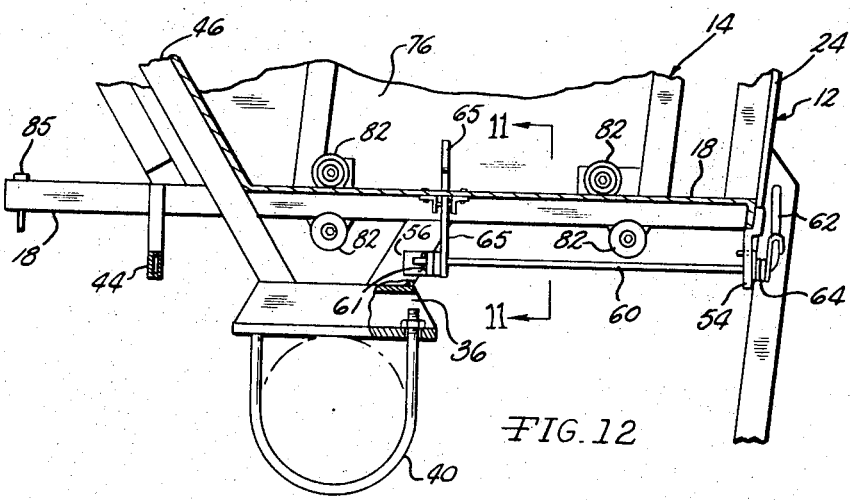
FIG. 12
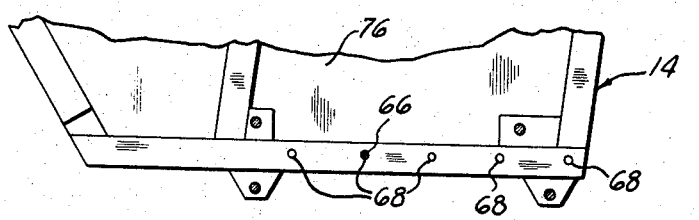
FIG. 13
INVENTOR
DONALD F. REYNOLDS
BY Olsen and Stephenson
ATTORNEYS 3,360,295
TRACTOR CAB ASSEMBLY
Donald F. Reynolds, 4415 E. Textile Road,
Ypsilanti, Mich. 48197
Filed June 13, 1966, Ser. No. 557,221
10 Claims. (Cl. 296—28)

The present invention relates to improvements in cabs for tractors and the like, and especially to a removable tractor cab and a support stand which can be used in mounting the cab on a tractor and removing the cab therefrom.

Numerous efforts have been made in the past to provide demountable or removable cab constructions which can be used with conventional farm tractors. Difficulties have been experienced in providing sufficiently rigid cab bodies in some instances, and in other instances difficulties have been encountered in providing suitable door openings for use by a driver of the tractor for ingress or egress on either side of the tractor. Also it is frequently desired by the operator of the tractor that he be able to stand erect while driving the tractor, and this has not been possible with the cab constructions previously developed, unless the cab has been constructed so that it has sufficient headroom to enable him to stand erect therein. Such constructions however are so large and bulky that they have not provided to be generally satisfactory. It is also frequently desired that the cab be removed from the tractor, and suitable means have not been provided in the past which will enable the operator of the tractor to do this by himself in an easy and simple manner.

Accordingly, it is an object of the present invention to provide an improved cab construction for a conventional farm tractor which is characterized by its simple, but sturdy construction, and which has a frame assembly adapted to be secured to the tractor and a cab body supported on the frame assembly.

It is another object of the present invention to provide an improved cab construction for a conventional farm tractor which is constructed and arranged to provide an enclosure for the driver of the tractor when the cab body is in a closed position and in which the cab body can be moved rearwardly to an open position enabling the driver of the tractor to enter or leave the cab while standing as well as to stand in an erect position overlooking the entire tractor and the top of the cab body when desired.

It is another object of the present invention to provide a cab construction of the foregoing character which is constructed and arranged so that the cab body can easily be moved rearwardly off of the frame assembly to a position disassociated from the farm tractor.

It is still another object of the present invention to provide a cab construction of the foregoing character which includes in combination therewith a stand which is adapted to receive the cab body when the latter is moved rearwardly off of the frame assembly.

It is still another object of the present invention to provide a cab construction and an associated stand of the foregoing character which are characterized by their simplicity and the ease with which the cab body can be moved to the stand.

It is still another object of the present invention to provide a cab construction which includes a frame assembly adapted to be mounted on a farm tractor and a cab body movable on the frame assembly to a plurality of selected positions.

It is another object of the present invention to provide a cab construction of the foregoing character wherein the frame assembly can be permanently mounted on the tractor without interfering with the normal operations of the tractor.

According to the present invention, a cab construction for a conventional farm tractor is provided which comprises a frame assembly adapted to be mounted on a tractor and a cab body supported on said frame assembly and adapted to be moved to select positions thereon, said frame assembly including horizontal tracks on its opposite sides and a front closure structure, said front closure structure having a removable windshield and upright frame members connected to the forward ends of said tracks and supporting said removable windshield, said cab body including top, side and rear panel portions cooperating with said front closure structure when the cab body is in a closed position to define a closure for the driver of the tractor, said cab body being movable rearwardly on said tracks from its closed position to an open position, and releasable means for locking said cab body on said tracks in either its closed position or its open position, said tracks terminating at the rear of said frame assembly so that said cab body can be moved rearwardly off said frame assembly when the means for locking the cab body in position are released. Said cab construction can be built in combination with a stand having tracks adapted to be aligned with the horizontal tracks of the frame assembly, and onto which said cab body can be moved when said cab body is moved rearwardly off said frame assembly.

Other objects of this invention will appear in the following description and appended claims, reference being had to the accompanying drawings forming a part of this specification wherein like reference characters designate corresponding parts in the several views.

In the drawings:

FIGURE 10 is a rear elevation of the cab construction mounted on the tractor, shown in phantom;

FIGURE 11 is an enlarged fragmentary section taken on the line 11—11 of FIG. 12, showing the releasable means for locking the cab body on the tracks of the frame assembly;

FIGURE 12 is an enlarged fragmentary section taken on the line 12—12 of FIG. 11; and FIGURE 13 is an enlarged fragmentary section taken on the line 13—13 of FIG. 11.

Figure 1:
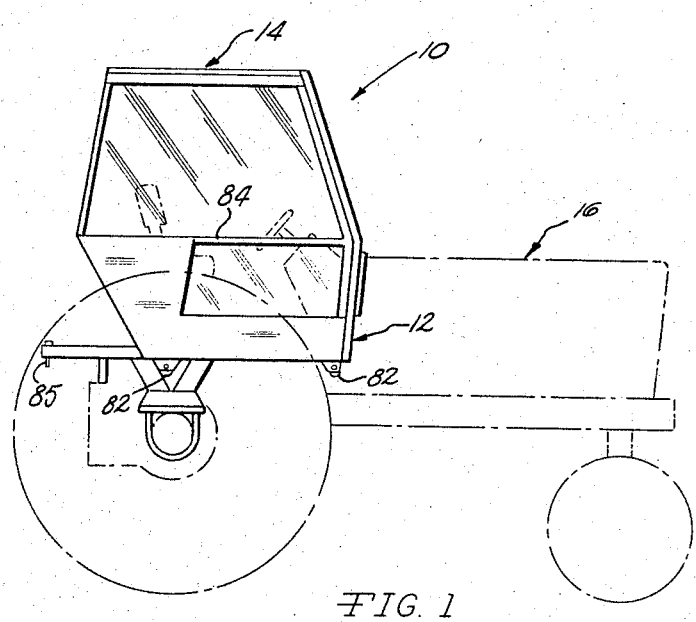
FIGURE 1 is a side elevational view showing a cab construction embodying the present invention, said cab construction being in its closed position on a conventional farm tractor which is shown in phantom.

Before explaining the present invention in detail, it is to be understood that the invention is capable of other embodiments and of being practiced or carried out in various ways. It is also to be understood that the phraseology or terminology employed herein is for the purpose of description and not of limitation.

Referring now to the drawings, the invention will be described in greater detail. The cab construction 10 comprises a frame assembly 12 and a cab body 14. The cab construction 10 is shown mounted in operative positions in several of the figures of the drawings on a conventional farm tractor 16 which is shown in phantom. It will be understood that the cab construction 10 is adapted to be used with farm tractors 16 of various sizes and configurations and it is not restricted in its use merely to one model of tractor. Also a variety of suitable securing means can be employed for securing a frame assembly onto the tractor, without departing from the present invention.

Figures 5, 9:
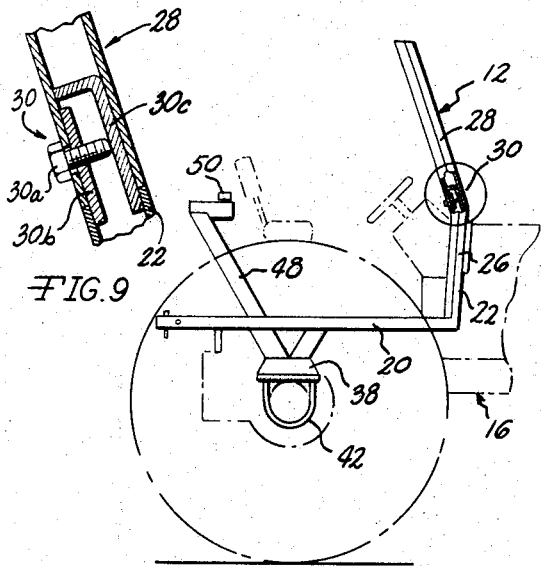
FIGURE 5 is a fragmentary side elevational view showing the frame assembly after the cab body has been removed therefrom.
FIGURE 9 is an enlarged fragmentary section of the encircled portion in FIG. 5.

The frame assembly 12 is intended to be mounted permanently on the tractor 16, and it includes horizontal tracks 18 and 20 which are disposed on the opposite sides thereof. Connected to the forward ends of the horizontal tracks is a front closure structure 22. The latter includes a pair of up-right frame members 24 and 26 which are connected to the forward ends of the tracks 18 and 20, respectively, and on which is removably mounted a windshield 28. As shown in FIGS. 5 and 9, the windshield 28 has portions which are telescoped over the upper ends of the upright members 22 and 24 and are secured in place thereon by means of the screw and expansion joint 30. In the illustrated embodiment, the screw 30a is threadedly connected to the frame element 30b and abuts against frame element 30c when in an operative position. Turning the screw 30a inwardly spreads frame elements 30b and 30c so as to firmly hold the windshield frame telescoped thereover. When it is desired to remove the windshield, it is only necessary to remove completely the two screws 30a and lift the windshield 28 from the frame elements 30b and 30c.

The front closure structure 22 also includes a front panel 32 which straddles the cowling 34 of the tractor 16 so as to provide a close fit. It will be recognized that the various tractors now on the market have different shapes to their cowlings, and therefore, it is contemplated that various interchangeable front panel members 32 can be used in the front closure structure 22 so as to provide a proper fit for the tractor in connection with which a particular cab construction 10 is to be used. Also, suitable means of different configurations may be used to secure the front closure structure 22 to the tractor.

Integrally connected to the tracks 18 and 20 and projecting there below are depending brackets 36 and 38 which are adapted to seat on the rear axle housings of the tractor 16 and to be secured thereto by means of the conventional U-bolts 40 and 42. A supporting strap 44 is also joined to the two tracks 18 and 20 and is adapted to extend across the rear of the tractor, and a similar supporting strap (not shown) joins the two tracks 18 and 20 and extends across the operations platform of the tractor. It will be understood that brackets 36 and 38 as well as the strap 44 and the front strap (not shown) and other attachments may be varied in design to accommodate the particular tractor for which the cab construction 10 is designed. Also formed as an integral part of the frame assembly 12 are the rigid arms 46 and 48 which extend upwardly from the brackets 36 and 38, and carry at their upper ends rollers 50 which are rotatable about a vertical axis, for a purpose to be described. The frame assembly 12 also includes the releasable means 52 for locking the cab body 14 in selected positions on the tracks 18 and 20.

Referring to FIGS. 11, 12 and 13, it will be observed that the releasable means 52 has support brackets 54 and 56 which are secured to the frame assembly 12. Supported by the brackets 54 and 56 is a shaft 60 that has one end 62 turned at a right angle to provide a handle for rotating shaft 60 about its axis and the other end is retained on the brackets by pin 61. A spring 64 is suitably connected to the handle 62 and to the bracket 54 to urge the rod 60 in one direction or rotation about its axis. A foot lever 65 is rigidly secured to shaft 60 for rotation therewith, and it has connected to it the pin 66 for movement through holes in the track 18 into a series of holes or sockets 68 in the cab body 14 for locking the latter in a fixed position on the tracks 18 and 20. Foot lever 65 can be used from within the cab body 14 to pivot to the broken line position in FIG. 11 so as to retract the pin 66 from its locking position with respect to cab body 14. It will be understood that the spring 64, which is operatively disposed between the handle 62 and the bracket 54, will function to urge the pin 66 to the right, as seen in FIG. 11, so that this pin will normally remain in a locked position in one of the sockets 68 of the cab 14.

The cab body 14 is constructed with an open front end which is adapted to fit against the front closure structure 22, and it has a closed top panel portion 74, opposite side panel portions 76 and 78, and a rear panel portion 80, which panel portions together with the front closure structure 22 provide a closed compartment for the operator of the tractor when the cab body 14 is in the closed position shown in FIG. 1. Mounted on the inner sides of each of the side panel portions 76 and 78 are forward and rearward sets of rollers 82 which are adapted to travel on the top and bottom surfaces of the tracks 18 and 20 for supporting the cab 14 on the frame assembly 12. The side portions 76 and 78 also have tracks 84 which extend horizontally and face inwardly, and against which the rollers 50 on the upwardly extending rigid arms 46 and 48 of the frame assembly 12 are adapted to travel to support the cab body 14 from being displaced laterally from the tracks 18 and 20, and particularly to prevent such displacement when the tractor 16 is being used with the cab body 14 in the open position shown in FIG. 2. Thus, it will be observed that the cab body 14 is supported on the frame assembly 12 by means of the sets of rollers 82 which, in effect, clampingly engage the tracks 18 and 20 at the forward and rearward ends of the cab body 14. In addition, rollers 50 travel on the tracks 84 on opposite sides of the cab body 14 to support the latter when in the open position as well as in the closed position. However, when the cab body 14 is in its closed position it will receive additional support against lateral displacement by means of the upright frame members 24 and 26 as well as the windshield 28. Suitable weather sealing materials will be carried by either or both of the joining edges of the front end and lower rear end of the cab body 14 and the front closure structure 22 so that an effective weather seal will be provided at these joints when the cab body is in its closed position. It is also to be understood that the windshield 28 as well as the side and rear panels of the body 14 are closed by suitable glass or clear plastic panels which provide visibility in all directions for the operator of the tractor.

From the foregoing description, it will be understood that the release means 52 will serve to lock the cab body 14 in the closed position shown in FIG. 1 or it may be used to lock the cab body 14 in a plurality of open positions when the pin 66 is seated in one of the holes or sockets 68 in the cab body 14. Thus, referring to FIG. 13, it will be seen that the pin 66 is shown seated in the socket 68 which corresponds to the open position of the cab shown in FIG. 2. When the cab is in the closed position, the pin 66 will be seated in the first socket 68 to the right in FIG. 13. It will also be understood that the release means 52 can be operated from the interior of the cab body 14 merely by the operator depressing the lever 65 with his foot, and the release means 52 can be actuated from a position externally of the cab body 14 by pivoting the end 62 of shaft 60. When the pin 66 is in a retracted position, the cab body 14 can move freely the length of the tracks 18 and 20 and, if desired, can be moved directly off the rear ends of the tracks, after removing safety lock pins 85. For this purpose, a stand 86 is provided which has a pair of spaced generally parallel tracks 88 and 90 which are supported on a plurality of vertically-adjustable legs 92. The tracks 88 and 90 have ends which are adapted to be fitted telescopically into the ends of the tracks 18 and 20 and to be pin-locked thereon, and thus, the tracks 88 and 90 form extensions of the tracks onto which the cab body 14 can be rolled. Pins 93 can be used for pin-locking the cab on the tracks, and pins 94 can be used to lock the tracks 18 and 20 to the tracks 88 and 90.

Figure 3:
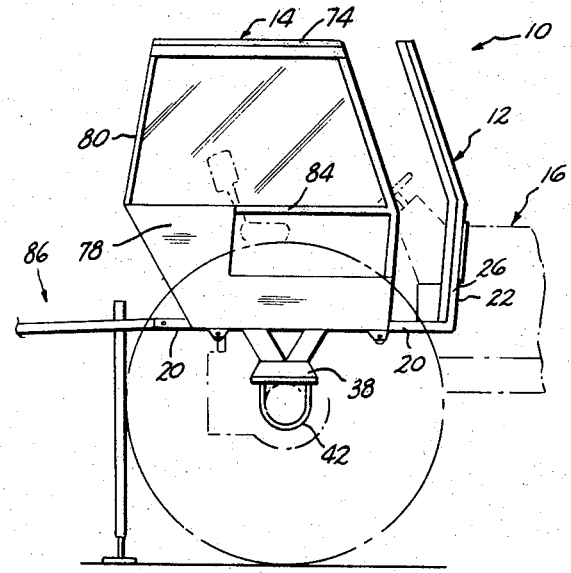
FIGURE 3 is another side elevational view, similar to FIG. 1, but showing a portion of a stand connected to the tracks of the frame assembly to enable the cab body to be moved rearwardly thereonto.
Figure 4:
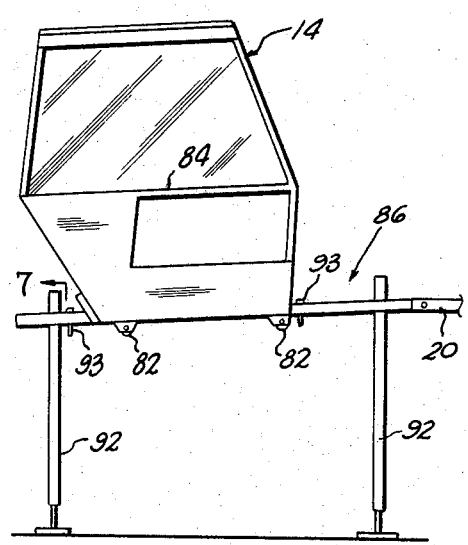
FIGURE 4 is a fragmentary side elevational view showing the cab body moved onto the stand of FIG. 3.

Thus, the stand 86 can readily be connected to the tracks 18 and 20 in the position shown in FIG. 3 after which the cab body 14 can be rolled to the position on stand 86 shown in FIG. 4. Thereafter, after disconnecting tracks 18 and 20 from the tracks 88 and 90, the tractor can be driven away from the stand. The tractor with its frame assembly 12 will then appear as is shown in FIG. 5. Also, if desired, the windshield 28 can be removed from the frame assembly 12 merely by removing the bolts 30a, that lock and expand the joints 30, and lifting the windshield off of the joints 30.

Figure 8:
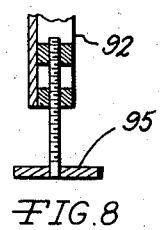
FIGURE 8 is an enlarged fragmentary section taken on the line 8—8 of FIG. 7.

As shown in FIG. 8, any suitable means may be employed for changing the effective elevations of the tracks 88 and 90. As shown in FIG. 8, a threaded member 95 can be turned relative to the leg 92 to vary the effective height of the leg 92. However, any other suitable mechanism for carrying out this purpose may be employed.

Figure 2:
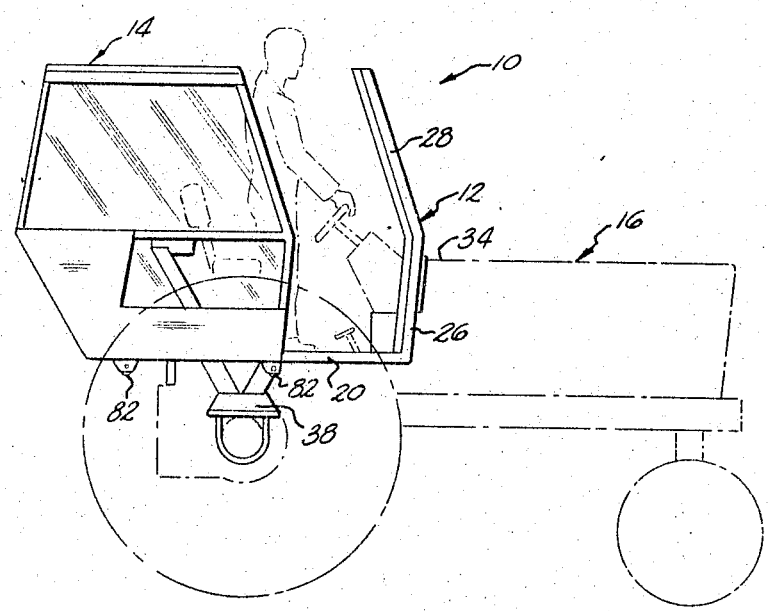
FIGURE 2 is a side elevational view of the cab construction shown in FIG. 1, but showing the cab body in an open position.
Figure 6:
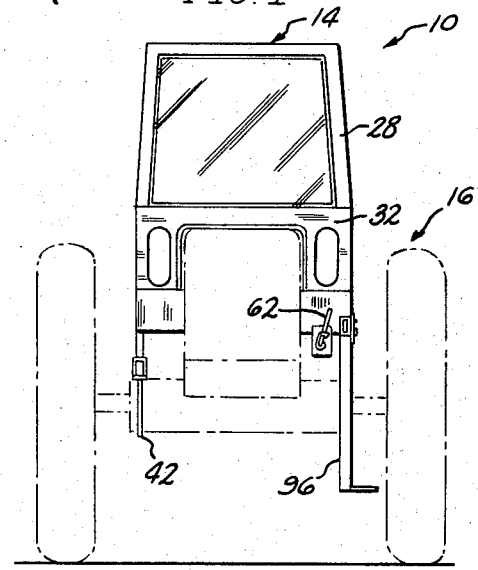
FIGURE 6 is a front elevational view showing the cab construction mounted on the tractor which is again shown in phantom.
Figure 7:
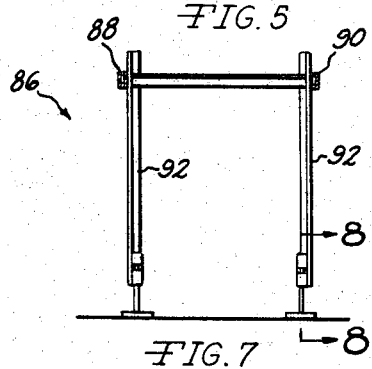
FIGURE 7 is a vertical section taken on the line 7—7 in FIG. 4, showing portions of the stand.

To facilitate entry into the cab body 14, the frame assembly 12 may also have a step 96 secured thereto to aid the operator when entering the cab construction in the open-cab position of FIG. 2. The step 96 may be connected to the frame assembly 12 by a suitable means including a sheer pin or a spring arrangement which will allow the step 96 to be deflected out of the vertical position shown in FIG. 6 in the event an obstruction is encountered by the step 96.

Having thus described my invention, I claim:

1. A cab construction for a conventional farm tractor comprising a frame assembly adapted to be mounted on the tractor and a cab body supported on said frame assembly and adapted to be moved to selected positions thereon, said frame assembly including horizontal tracks on its opposite sides and a stationary front closure structure, said front closure structure having a windshield and upright frame members connected to the forward ends of said tracks and supporting said windshield, said cab body including top, side and rear panel portions cooperating with said front closure structure when the cab body is in a closed position to define an enclosure for the driver of the tractor, said cab body being movable rearwardly on said tracks from its closed position to an open position, and releasable means for locking said cab body on said tracks in either its closed position or its open position, said tracks terminating at the rear of said frame assembly so that said cab body can be moved rearwardly off said frame assembly when the means for locking the cab body in position are released.

2. A cab construction according to claim 1, wherein said cab body has mounted adjacent to the lower edges of its side panel portions two sets of rollers which are in engagement respectively with the upper and lower surfaces of said tracks for movement of the cab body on the tracks.

3. A cab construction according to claim 2, wherein said frame assembly includes lateral support means for said cab body comprising rollers supported for rotation on vertical axes near the rear and substantially above said tracks, said side panel portions having horizontally disposed tracks arranged lengthwise thereof for travelling on said rollers.

4. A cab construction according to claim 1, wherein said releasable means comprises a spring-actuated pin supported on said frame assembly for axial movement and spring-urged laterally outwardly of the frame assembly, said cab body having a plurality of sockets arranged horizontally along its length for receiving the spring-urged pin.

5. A cab construction according to claim 4, wherein said releasable means includes manually operable means located both internally and externally of the confines of the closed cab body and operably connected to said spring-urged pin for moving said spring-urged pin inwardly of the frame assembly so that it is retracted from any of said sockets into which it may have been spring-urged.

6. A cab construction according to claim 1, wherein said windshield is releasably secured to said upright frame members.

7. A cab construction according to claim 1, wherein said frame assembly includes depending brackets on opposite sides adapted to seat on the axle housing of said tractor, and U-bolts for securing said brackets to such housings.

8. A cab construction according to claim 1, and including in combination therewith a stand having tracks adapted to be aligned with said horizontal tracks and onto which said cab body can be moved when said cab body is moved rearwardly off said frame assembly.

9. The combination according to claim 8, wherein said horizontal tracks and the tracks of said stand have mating portions for fitting them together.

10. The combination according to claim 8, wherein said stand is vertically adjustable for aligning said horizontal tracks and tracks of said stand.

References Cited

UNITED STATES PATENTS 2,667,379   1/1954   Baze _____ 296—28
3,206,245   7/1965   Westrum et al. _____ 296—102

LEO FRIAGLIA, *Primary Examiner.*

J. A. PEKAR, *Assistant Examiner.*